United States Patent
Hassan (10) Patent No.: US 10,474,557 B2
(45) Date of Patent: Nov. 12, 2019

(54) SOURCE CODE PROFILING FOR LINE-LEVEL LATENCY AND ENERGY CONSUMPTION ESTIMATION

(71) Applicant: SAP SE, Walldorf (DE)

(72) Inventor: Ahmad Hassan, Belfast (IE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/214,019

(22) Filed: Jul. 19, 2016

(65) Prior Publication Data
US 2018/0024913 A1    Jan. 25, 2018

(51) Int. Cl.
G06F 11/36 (2006.01)

(52) U.S. Cl.
CPC .............. *G06F 11/3668* (2013.01)

(58) Field of Classification Search
CPC ......... G06F 11/3466; G06F 2201/1865; G06F 11/3636
USPC ......................................... 717/130
See application file for complete search history.

(56) References Cited

U.S. PATENT DOCUMENTS

| | | | |
|---|---|---|---|
| 5,845,325 A | 12/1998 | Loo | |
| 6,157,955 A | 12/2000 | Narad et al. | |
| 6,195,731 B1 | 2/2001 | Bordaz et al. | |
| 6,760,721 B1 | 7/2004 | Chasen | |
| 6,952,664 B1 * | 10/2005 | Lahiri ................. | G06F 17/5022 703/13 |
| 7,181,578 B1 | 2/2007 | Guha | |
| 7,360,073 B1 | 4/2008 | Billstrom et al. | |
| 7,434,002 B1 | 10/2008 | Zedlewski et al. | |
| 7,624,381 B1 | 11/2009 | Czajkowski et al. | |
| 7,774,556 B2 | 8/2010 | Karamcheti et al. | |
| 7,840,397 B2 | 11/2010 | Chiou | |
| 7,958,329 B2 | 6/2011 | Holt | |
| 8,170,859 B1 | 5/2012 | Christensson et al. | |
| 8,185,471 B1 | 5/2012 | Walker et al. | |
| 8,214,191 B2 * | 7/2012 | Ferren ................. | G06F 11/3466 703/22 |
| 8,230,395 B1 | 7/2012 | Koh et al. | |
| 8,456,905 B2 | 6/2013 | Kasorla | |
| 8,572,051 B1 | 10/2013 | Chen et al. | |
| 8,862,588 B1 | 10/2014 | Gay | |
| 8,868,537 B1 | 10/2014 | Colgrove et al. | |

(Continued)

OTHER PUBLICATIONS

Zakai, Alon, An LLVM to Javascript Compiler, 2011, ACM. (Year: 2011).*

(Continued)

*Primary Examiner* — John Q Chavis
(74) *Attorney, Agent, or Firm* — Fish & Richardson P.C.

(57) ABSTRACT

Implementations of the present disclosure include methods, systems, and computer-readable storage mediums for receiving source code of an application, providing intermediate code based on the source code, the intermediate code including at least one instruction for profiling at least one line of the source code, providing profiling data by processing the intermediate code, processing the profiling data based on one or more of a latency model and an energy model to respectively provide at least one latency metric and at least one energy metric of the at least one line, and storing modified source code that is provided based on a modification of the at least one line of source code.

20 Claims, 3 Drawing Sheets

(56) References Cited

U.S. PATENT DOCUMENTS

| | | | |
|---|---|---|---|
| 8,874,846 B2* | 10/2014 | Franceschini | G06F 12/0802 |
| | | | 711/118 |
| 8,880,687 B1 | 11/2014 | Chandrachari et al. | |
| 8,959,611 B1 | 2/2015 | Vincent | |
| 8,966,462 B2 | 2/2015 | Gounares et al. | |
| 9,043,530 B1 | 5/2015 | Sundaram et al. | |
| 9,304,913 B2 | 4/2016 | Dong et al. | |
| 9,348,539 B1 | 5/2016 | Saxena | |
| 9,626,327 B2 | 4/2017 | Eilert et al. | |
| 9,652,380 B2 | 5/2017 | Byun et al. | |
| 9,672,158 B2 | 6/2017 | Karamcheti et al. | |
| 9,712,538 B1 | 7/2017 | Vincent et al. | |
| 9,720,925 B1 | 8/2017 | Lawson | |
| 9,720,967 B2 | 8/2017 | Lee et al. | |
| 9,740,438 B2* | 8/2017 | Hassan | G06F 3/0685 |
| 9,841,914 B2* | 12/2017 | Hassan | G06F 3/0625 |
| 9,846,550 B2* | 12/2017 | Muralimanohar | G11C 8/12 |
| 10,083,183 B2 | 9/2018 | Hassan | |
| 2001/0027387 A1 | 10/2001 | Miyake et al. | |
| 2003/0033431 A1 | 2/2003 | Shinomiya | |
| 2003/0065648 A1 | 4/2003 | Driesch, et al. | |
| 2004/0184340 A1* | 9/2004 | Dwarkadas | G06F 12/0864 |
| | | | 365/230.03 |
| 2005/0097078 A1 | 5/2005 | Lohman et al. | |
| 2005/0108447 A1 | 5/2005 | Thadani | |
| 2006/0059474 A1 | 3/2006 | Bhansali et al. | |
| 2006/0117299 A1 | 6/2006 | Goldsmith et al. | |
| 2007/0050328 A1 | 3/2007 | Li | |
| 2007/0050609 A1* | 3/2007 | Ferren | G06F 11/3466 |
| | | | 712/227 |
| 2007/0202473 A1 | 8/2007 | Koda | |
| 2007/0226186 A1 | 9/2007 | Ewen et al. | |
| 2008/0005476 A1 | 1/2008 | Venkatesan | |
| 2008/0034179 A1 | 2/2008 | Mewhinney et al. | |
| 2008/0109592 A1 | 5/2008 | Karamcheti et al. | |
| 2008/0140682 A1 | 6/2008 | Grosset et al. | |
| 2008/0288718 A1 | 11/2008 | Hepkin et al. | |
| 2008/0288742 A1 | 11/2008 | Hepkin et al. | |
| 2009/0049234 A1 | 2/2009 | Oh et al. | |
| 2009/0157952 A1 | 6/2009 | Kim et al. | |
| 2009/0157964 A1 | 6/2009 | Kasorla | |
| 2009/0182976 A1 | 7/2009 | Agesen et al. | |
| 2009/0307462 A1 | 12/2009 | Fleming et al. | |
| 2010/0010799 A1 | 1/2010 | Altrichter | |
| 2010/0042999 A1 | 2/2010 | Dorai et al. | |
| 2010/0153631 A1 | 6/2010 | Moon et al. | |
| 2010/0169602 A1 | 7/2010 | Hulbert et al. | |
| 2010/0262633 A1 | 10/2010 | Bhattacharjee et al. | |
| 2010/0287356 A1 | 11/2010 | Cameron et al. | |
| 2010/0306591 A1 | 12/2010 | Krishna | |
| 2010/0318718 A1 | 12/2010 | Eilert et al. | |
| 2011/0066808 A1 | 3/2011 | Flynn et al. | |
| 2011/0072006 A1 | 3/2011 | Yu et al. | |
| 2011/0078340 A1 | 3/2011 | Kim et al. | |
| 2011/0093654 A1 | 4/2011 | Roberts et al. | |
| 2011/0131199 A1 | 6/2011 | Simon et al. | |
| 2011/0271264 A1* | 11/2011 | Vorbach | G06F 8/447 |
| | | | 717/149 |
| 2011/0313999 A1 | 12/2011 | Bruno et al. | |
| 2012/0072744 A1 | 3/2012 | Jain et al. | |
| 2012/0089595 A1 | 4/2012 | Jaecksch | |
| 2012/0124318 A1 | 5/2012 | Bivens | |
| 2012/0144092 A1 | 6/2012 | Hsieh | |
| 2012/0151127 A1 | 6/2012 | Lim | |
| 2012/0151252 A1 | 6/2012 | Harris et al. | |
| 2012/0158799 A1 | 6/2012 | Morsi et al. | |
| 2012/0246392 A1 | 9/2012 | Cheon | |
| 2012/0290768 A1 | 11/2012 | Rubowitz et al. | |
| 2013/0013860 A1* | 1/2013 | Franceschini | G06F 12/0802 |
| | | | 711/118 |
| 2013/0074092 A1 | 3/2013 | Gounares et al. | |
| 2013/0080621 A1 | 3/2013 | Jain et al. | |
| 2013/0081005 A1 | 3/2013 | Gounares et al. | |
| 2013/0086309 A1 | 4/2013 | Lee | |
| 2013/0103380 A1 | 4/2013 | Brandstatter et al. | |
| 2013/0226903 A1 | 8/2013 | Wu et al. | |
| 2013/0246698 A1 | 9/2013 | Estan | |
| 2013/0275716 A1 | 10/2013 | Nishida | |
| 2013/0283250 A1 | 10/2013 | Eichenberger | |
| 2013/0326109 A1 | 12/2013 | Kivity | |
| 2014/0007043 A1* | 1/2014 | Aliseychik | G06F 9/4881 |
| | | | 717/106 |
| 2014/0089564 A1 | 3/2014 | Liu et al. | |
| 2014/0108723 A1 | 4/2014 | Nowoczynski | |
| 2014/0188870 A1 | 7/2014 | Borthakur | |
| 2014/0280685 A1 | 9/2014 | Magenheimer | |
| 2014/0281212 A1 | 9/2014 | Schreter et al. | |
| 2014/0281249 A1 | 9/2014 | Waldsperger | |
| 2014/0282455 A1* | 9/2014 | Felch | G06F 8/4441 |
| | | | 717/158 |
| 2014/0293801 A1 | 10/2014 | Dimou | |
| 2015/0012465 A1 | 1/2015 | Pingenot | |
| 2015/0062736 A1 | 3/2015 | Kim et al. | |
| 2015/0077426 A1 | 3/2015 | Kweon et al. | |
| 2015/0081300 A1 | 3/2015 | Kim | |
| 2015/0089604 A1 | 3/2015 | Mathew | |
| 2015/0106582 A1 | 4/2015 | Mai et al. | |
| 2015/0169226 A1 | 6/2015 | Shen et al. | |
| 2015/0199126 A1 | 7/2015 | Jayasena | |
| 2015/0206574 A1 | 7/2015 | Greathouse | |
| 2015/0309789 A1 | 10/2015 | Thorat | |
| 2015/0363319 A1 | 12/2015 | Qi | |
| 2015/0370560 A1 | 12/2015 | Tan | |
| 2015/0378169 A1 | 12/2015 | Naeimi | |
| 2016/0005423 A1 | 1/2016 | Neppalli et al. | |
| 2016/0019132 A1 | 1/2016 | Vilakkunnadathil | |
| 2016/0117241 A1* | 4/2016 | Shah | G06F 12/0871 |
| | | | 711/119 |
| 2016/0117258 A1 | 4/2016 | Karamcheti et al. | |
| 2016/0125927 A1 | 5/2016 | Wei | |
| 2016/0150003 A1 | 5/2016 | Magdon-Ismall | |
| 2016/0179685 A1 | 6/2016 | Byun et al. | |
| 2016/0188217 A1 | 6/2016 | Golander et al. | |
| 2016/0196112 A1* | 7/2016 | Edwards | G06F 8/4441 |
| | | | 717/107 |
| 2016/0196324 A1 | 7/2016 | Haviv et al. | |
| 2016/0205174 A1* | 7/2016 | Pitio | H04L 67/10 |
| | | | 709/201 |
| 2016/0253093 A1 | 9/2016 | Zhang | |
| 2016/0321048 A1 | 11/2016 | Matsuura | |
| 2016/0328169 A1* | 11/2016 | Hassan | G06F 3/0625 |
| 2016/0336069 A1 | 11/2016 | Lin | |
| 2016/0378169 A1 | 12/2016 | Naeimi | |
| 2016/0378829 A1 | 12/2016 | Vengerov et al. | |
| 2016/0378977 A1 | 12/2016 | Alme et al. | |
| 2017/0010817 A1 | 1/2017 | Lim | |
| 2017/0052741 A1 | 2/2017 | Hassan | |
| 2017/0052742 A1 | 2/2017 | Hassan | |
| 2017/0060740 A1 | 3/2017 | Doerner | |
| 2017/0090776 A1 | 3/2017 | Kowles | |
| 2017/0091334 A1 | 3/2017 | Kabiljo et al. | |
| 2017/0115892 A1 | 4/2017 | Gokita | |
| 2017/0116210 A1 | 4/2017 | Park et al. | |
| 2017/0147516 A1 | 5/2017 | De | |
| 2017/0154136 A1 | 6/2017 | Eckmann et al. | |
| 2017/0160955 A1 | 6/2017 | Jayasena | |
| 2017/0161198 A1 | 6/2017 | Trika | |
| 2017/0193136 A1* | 7/2017 | Prasad | G06F 17/505 |
| 2017/0206010 A1 | 7/2017 | Nachimuthu | |
| 2017/0206172 A1 | 7/2017 | Ma | |
| 2017/0212843 A1 | 7/2017 | Agesen et al. | |
| 2017/0220256 A1 | 8/2017 | Balasubramonian | |
| 2017/0220257 A1 | 8/2017 | Balasubramonian | |
| 2017/0220488 A1 | 8/2017 | Balasubramonian | |
| 2017/0220516 A1 | 8/2017 | Eilert et al. | |
| 2017/0223046 A1 | 8/2017 | Singh | |
| 2017/0242595 A1 | 8/2017 | Niu | |
| 2017/0289000 A1* | 10/2017 | Park | H04L 43/04 |
| 2017/0301386 A1 | 10/2017 | Parks et al. | |
| 2017/0352012 A1 | 12/2017 | Hearn et al. | |
| 2018/0024750 A1 | 1/2018 | Hassan | |
| 2018/0024754 A1 | 1/2018 | Hassan | |
| 2018/0024755 A1 | 1/2018 | Hassan | |

(56) References Cited

U.S. PATENT DOCUMENTS

| | | |
|---|---|---|
| 2018/0024821 A1 | 1/2018 | Hassan |
| 2018/0024922 A1 | 1/2018 | Hassan |
| 2018/0024923 A1 | 1/2018 | Hassan |
| 2018/0024928 A1 | 1/2018 | Hassan |
| 2018/0024997 A1 | 1/2018 | Hassan |
| 2018/0025016 A1 | 1/2018 | Hassan |
| 2018/0025055 A1 | 1/2018 | Hassan |
| 2018/0025904 A1 | 1/2018 | Hassan |
| 2019/0057131 A1 | 2/2019 | Hassan |

OTHER PUBLICATIONS

U.S. Appl. No. 14/704,461, Ahmad Hassan, filed May 5, 2015.
U.S. Appl. No. 14/831,567, Ahmad Hassan, filed Aug. 20, 2015.
U.S. Appl. No. 14/831,624, Ahmad Hassan, filed Aug. 20, 2015.
U.S. Appl. No. 15/213,621, filed Jul. 19, 2016, Ahmad Hassan.
U.S. Appl. No. 15/213,626, filed Jul. 19, 2016, Ahmad Hassan.
U.S. Appl. No. 15/213,654, filed Jul. 19, 2016, Ahmad Hassan.
U.S. Appl. No. 15/213,674, filed Jul. 19, 2016, Ahmad Hassan.
U.S. Appl. No. 15/213,754, filed Jul. 19, 2016, Ahmad Hassan.
U.S. Appl. No. 15/213,816, filed Jul. 19, 2016, Ahmad Hassan.
U.S. Appl. No. 15/213,861, filed Jul. 19, 2016, Ahmad Hassan.
U.S. Appl. No. 15/213,930, filed Jul. 19, 2016, Ahmad Hassan.
U.S. Appl. No. 15/213,960, filed Jul. 19, 2016, Ahmad Hassan.
U.S. Appl. No. 15/214,082, filed Jul. 19, 2016, Ahmad Hassan.
U.S. Appl. No. 15/214,102, filed Jul. 19, 2016, Ahmad Hassan.
U.S. Appl. No. 15/677,700, filed Aug. 15, 2016, Ahmad Hassan.
Dhiman et al., "PDRAM: A hybrid PRAM and DRAM main memory system," Proceedings of the 46th Annual Design Automation Conference, Jul. 26-31, 2009, pp. 664-669.
Hassan et al., "Energy-Efficient In-Memory Data Stores on Hybrid Memory Hierarchies," Eleventh International Workshop on Dada Management on New Hardware, Jun. 2015, last retrieved from https://event.cwi.nl/damon2015/slides/slides-hassan.pdf on Jan. 5, 2018.
Hassan et al., "Analytical models and techniques for Software-Managed Energy-Efficient Hybrid DRAM/NVM Main Memory," AMC International Conference on Computing Frontiers 2015, May 18-21, 2015.
Hu et al., "Data allocation optimization for hybrid scratch pad memory with sram and nonvolatile memory," IEEE Transactions on Very Large Scale Integration (VLSI) Systems, Jun. 2013, 21(6): 1094-1102.
Li et al., "Assert(!Defined(Sequential I/O))," Proceedings of the 6th USENIX Conference on Hot Topics in Storage and File Systems, Jun. 17-18, 2014, 1-5.
Mogul et al., "Operating system support for NVM+DRAM hybrid main memory," Proceedings of teh 12th Conference on Hot Topics in Operating Systems, May 18-20, 2009, 1-5.
Ramos et al., "Page placement in hybrid memory systems," Proceedings of the International Conference on Supercomputing, May 31-Jun. 4, 2011.
Wang et al., "Optimized Allocation of Data Variables to PCM/DRAM-based Hybrid Main Memory for Real-Time Embedded Systems," Embedded Systems Letters, IEEE, Sep. 2014, 6(3):61-64.
USPTO Office Action in related U.S. Appl. No. 15/213,654 dated Dec. 1, 2017; 21 pages.
USPTO Office Action in related U.S. Appl. No. 15/213,654 dated Mar. 16, 2018; 31 pages.
USPTO Office Action in related U.S. Appl. No. 15/213,960 dated Jan. 11, 2018; 22 pages.
USPTO Office Action in related U.S. Appl. No. 15/213,621 dated May 17, 2018; 11 pages.
U.S. Office Action in related U.S. Appl. No. 15/213,626 dated Apr. 12, 2019, 23 pages.
U.S. Office Action in related U.S. Appl. No. 15/213,674 dated Apr. 12, 2019, 27 pages.
Luk et al., "Pin Building Customized Program Analysis Tools with Dynamic Instrumentation," ACM Sigplan Notices, Jun. 2005, 40(6) 190-200.
U.S. Office Action in related U.S. Appl. No. 15/213,621 dated Dec. 13, 2018, 12 pages.
U.S. Office Action in related U.S. Appl. No. 15/213,654 dated Jul. 2, 2018, 41 pages.
U.S. Office Action in related U.S. Appl. No. 15/213,654 dated Nov. 27, 2018, 7 pages.
U.S. Office Action in related U.S. Appl. No. 15/213,754 dated Feb. 27, 2018, 23 pages.
U.S. Office Action in related U.S. Appl. No. 15/213,754 dated Jan. 29, 2019, 29 pages.
U.S. Office Action in related U.S. Appl. No. 15/213,754 dated Jun. 20, 2018, 22 pages.
U.S. Office Action in related U.S. Appl. No. 15/213,754 dated Sep. 11, 2018, 22 pages.
U.S. Office Action in related U.S. Appl. No. 15/213,816 dated Feb. 7, 2019, 27 pages.
U.S. Office Action in related U.S. Appl. No. 15/213,816 dated Jul. 26, 2018, 27 pages.
U.S. Office Action in related U.S. Appl. No. 15/213,930 dated Jun. 19, 2018, 20 pages.
U.S. Office Action in related U.S. Appl. No. 15/213,930 dated Mar. 9, 2018, 20 pages.
U.S. Office Action in related U.S. Appl. No. 15/213,930 dated Oct. 19, 2018, 23 pages.
U.S. Office Action in related U.S. Appl. No. 15/213,960 dated Dec. 13, 2018, 22 pages.
U.S. Office Action in related U.S. Appl. No. 15/213,960 dated Jul. 12, 2018, 24 pages.
U.S. Office Action in related U.S. Appl. No. 15/214,082 dated Aug. 27, 2018, 27 pages.
U.S. Office Action in related U.S. Appl. No. 15/214,102 dated Feb. 6, 2019, 34 pages.
U.S. Office Action in related U.S. Appl. No. 15/214,102 dated Jul. 24, 2018, 33 pages.
Office Action in U.S. Appl. No. 15/213,930 dated Feb. 26, 2019, 35 pages.
Final Office Action issued in U.S. Appl. No. 15/214,082 dated Mar. 8, 2019, 41 pages.
Chen et al., "FSRAM: Flexible Sequential and Random Access Memory for Embedded Systems" Laboratory for Advanced Research in Computing Technology and Compilers Technical Report No. ARCTiC, Mar. 1, 2004, 6 pages.
Dulloor et al., "Data tiering in heterogeneous memory systems" Proceedings of the Eleventh European Conference on Computer Systems, ACM, Apr. 18, 2016, 16 pages.
Ouyang et al., "SSD-Assisted Hybrid Memory to Accelerate Menricached over High Performance Networks" 2012 41st International Conference on Parallel Processing, IEEE, Sep. 10, 2012, 10 pages.
U.S. Office Action in U.S. Appl. No. 15/213,754 dated May 23, 2019, 32 pages.
U.S. Office Action in related U.S. Appl. No. 15/213,816 on Jun. 18, 2019, 46 pages.
Wang et al., "NVMalloc: Exposing an Aggregate SSD Store as a Memory Partition in Extreme-Scale Machines" 2012 IEEE 26th international Parallel and Distributed Processing Symposium, May 21, 2012, 12 pages.
Non-final office action issued in U.S. Appl. No. 15/214,082 dated Sep. 6, 2019, 36 pages.
Final office action issued in U.S. Appl. No. 15/213,654 dated Jul. 18, 2019, 21 pages.

* cited by examiner

SOURCE CODE PROFILING FOR LINE-LEVEL LATENCY AND ENERGY CONSUMPTION ESTIMATION

BACKGROUND

A business or other type of enterprise may operate enterprise systems to provide software functionality to customers and employees. An enterprise system may include back-end enterprise servers that host enterprise applications such as enterprise resource planning (ERP) systems, client-relationship management (CRM) systems, product lifecycle management (PLM) systems, supply chain management (SCM) systems, supplier relationship management (SRM) systems, and so forth. During the execution of an enterprise application, application data may be placed in or accessed from the main memory of the enterprise server, such that the application data is immediately accessible by processors of the enterprise server.

Increasingly, large amounts of application data are stored in the main memory of enterprise servers. Main memory may include dynamic random access memory (DRAM), which consumes a relatively high amount of static energy both in active and idle states due to continuous leakage and refresh power. Various byte-addressable non-volatile memory (NVM) technologies promise near-zero static energy and persistence. However, NVM may exhibit high latency and high dynamic energy relative to DRAM.

SUMMARY

Implementations of the present disclosure include computer-implemented methods for providing line-level profile data for source code. In some implementations, methods include actions of receiving source code of an application, providing intermediate code based on the source code, the intermediate code including at least one instruction for profiling at least one line of the source code, providing profiling data by processing the intermediate code, processing the profiling data based on one or more of a latency model and an energy model to respectively provide at least one latency metric and at least one energy metric of the at least one line, and storing modified source code that is provided based on a modification of the at least one line of source code.

These and other implementations may each optionally include one or more of the following features: the at least one instruction is provided based on at least one annotation included in the source code, the at least one annotation annotating the at least one line and indicating that the at least one line is to be profiled; the at least one annotation includes an annotation immediately preceding the at least one line, and an annotation immediately following the at least one line; the latency metric indicates a latency in accessing memory based on execution of the at least one line; the energy metric indicates an energy consumed in accessing memory based on execution of the at least one line; the profiling data is provided based on a cache simulator; and the modification of the at least one line of source code improves at least one of the at least one latency metric and at least one energy metric.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to a computer-executable tool to conduct analyses on application source code. More particularly, implementations of the present disclosure enable line-level instrumentation of source code to measure latency and energy consumed through execution. In some implementations, the computer-implemented tool of the present disclosure enables an application programmer developer to annotate any line in the source code, the annotations being used for latency and energy measurement of respective lines during execution of the application. In this manner, applications can be optimized by pin-pointing problematic (in terms of latency and/or energy consumption) lines of source code. These lines of source code lines embody any type of functionality (e.g., function calls, memory allocations).

To provide context for implementations of the present disclosure, real-time data analytics aim at making knowledge available with sub-second and often sub-millisecond response time. For example, real-time enterprise resource planning (ERP) systems enable enterprises to view every change in the enterprise as soon as it happens, and can be a driver in the success of the enterprise. In some examples, real-time access to information helps in gaining competitive advantage through efficient and improved (e.g., more informed) decision making, product pricing, risk management, product life-cycle, customer feedback, customer engagement, brand development, product pricing, and reduced total cost of ownership (TCO). The growing volumes of enterprise data makes it challenging to achieve the target response times in real-time data analytics.

The advances in multi-core processing, caching and less expensive main memory has brought a major breakthrough in designing real-time enterprise systems. In-memory databases open doors for real-time analytics as it uses faster main-memory as a primary storage, and bypasses I/O disk delays in analytical data processing. Improvements in both hardware and in-memory databases have triggered the unification of both operational and analytical storage models together in a unified in-memory data store. For example, slower, disk-based memory is only required for persistent storage. This has a negligible impact on the throughput of in-memory databases, because persistence is moved from the critical path. Accordingly, in-memory databases enable real-time data analytics on unified data with minimal response times, because the data resides in main memory, which is an order of magnitude faster for accessing than traditional, disk-based memory.

Applications, such as real-time ERP application, are increasing in complexity, and the source code lines of applications are continuously growing. In order to optimize applications for latency or energy, in-depth analyses of the source code can be performed to identify lines of code that are bottlenecks in terms of latency and energy. However, tools used to perform such analyses can be inaccurate and inefficient.

In view of the above context, and as described in further detail herein, implementations of the present disclosure are generally directed to a computer-executable tool to conduct analyses on application source code. More particularly, implementations of the present disclosure enable line-level instrumentation of source code to measure latency and energy consumed through execution. In some implementations, the computer-implemented tool of the present disclosure enables an application programmer developer to annotate any line in the source code, the annotations being used for latency and energy measurement of respective lines during execution of the application. In this manner, applications can be optimized by pin-pointing problematic (in terms of latency and/or energy consumption) lines of source code. These lines of source code lines embody any type of functionality (e.g., function calls, memory allocations).

Figure 1:
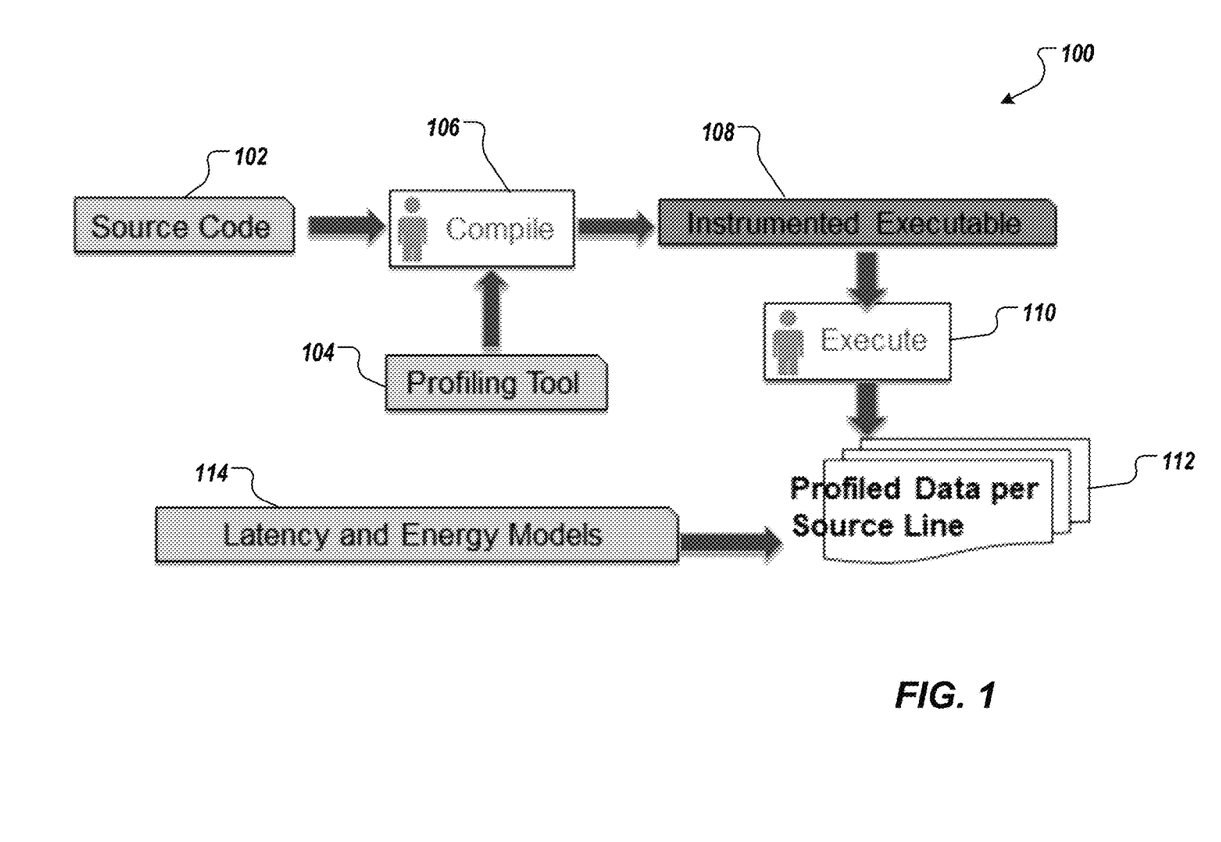
FIG. 1 depicts a diagram of an example methodology in accordance with implementations of the present disclosure.

FIG. 1 depicts a diagram 100 of an example methodology in accordance with implementations of the present disclosure. The example diagram 100 includes source code 102, a profiling tool 104, a compiler 106, an instrumented executable 108, an execution environment 110, data profiles 112, and latency model and/or energy model 114. In some examples, the source code 102 is provided as human-readable code that underlies an application that is to be profiled. In some examples, the profiling tool 104 includes annotations that can be added to individual lines to the source code to provide data regarding energy and/or latency for respective lines. The source code 102 can be annotated, as described herein, and is provided to the compiler 106, which compiles the annotated source code into the instrumented executable 108. In some examples, the instrumented executable 108 is provided as one or more computer-executable files that can be executed by one or more computing devices. The instrumented executable 108 is executed in the execution environment 110 to provide the profile data 112. The latency model and/or energy model 114 can be applied to the profile data 112 to provide latency and/or energy measurements for individual lines of the source code.

In accordance with implementations of the present disclosure, and as described in further detail herein, a tool library is used to profile individual lines of source code, and provide profile data (e.g., the profile data 112 of FIG. 1). In one examples, the source code underlies an application that is used to provide an in-memory database, and includes N lines of source code. If the developer can determine, which of the N lines of the source code consume the most access time (latency) and/or the energy, the developer, or a computer-executable compiler can optimize those lines in order to improve the performance of the application on the underlying hardware.

In some implementations, an application program interface (API) is provided, and is inserted into the source code for each line that is to be profiled. In some examples, the API includes a plurality of functions that can be used to apply annotations to the source for the beginning and end of a line that is to be profiled. Example functions can include a start profiling function (e.g., startProfiling (LINE NUMBER, START TIME)), and an end profiling function (e.g., endProfiling (LINE NUMBER, END TIME)). For example, if a particular line of source code is to be profiled, the start profiling function is inserted immediately before the line, and the end profiling function is inserted immediately following the line.

Figure 2:
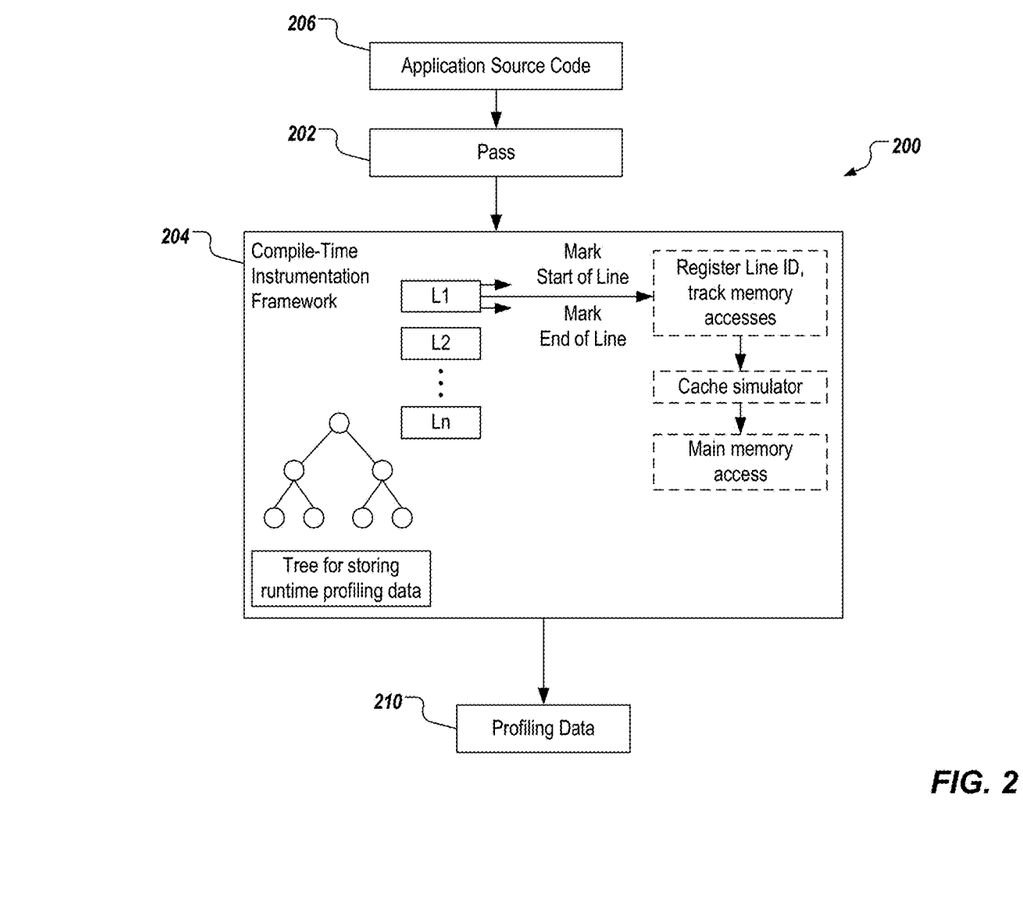
FIG. 2 depicts an example architecture to line-level profile data in accordance with implementations of the present disclosure.

FIG. 2 depicts an example architecture 200 to provide line-level profile data in accordance with implementations of the present disclosure. In the depicted example, the example architecture 200 includes a pass 202 (e.g., an LLVM pass), and a compile-time instrumentation framework 204. In some examples, the pass 202 receives application source code 206 (e.g., source code of the application, one or more lines of which are to be individually profiled), and provides executable code (e.g., the instrumented executable 108 of FIG. 1). In some examples, the pass 202 compiles the source code and adds instrumentation code to provide the executable code. In some examples, the instrumentation code includes instructions to profile one or more lines of the application during execution.

In some examples, the executable code 208 is provided as bit-code (e.g., machine-readable code) and is executed by the compile-time instrumentation framework 204 to provide a profiling data 210, as described in further detail herein. In some examples, the profiling data 210 provides, for each line that is to be profiled, memory access data.

In accordance with implementations of the present disclosure, the profiling library creates a node in SPLAY tree for each of the line markers that the programmer has added into the source code. In some examples, a SPLY tree is a self-adjusting binary search tree that enables recently accessed elements to be relatively quickly re-accessed. In some implementations, the profiling library profiles all of the data objects that are created during execution of the lines that are to be profiled. In some examples, the profiling tool stores all of the loads and stores issued by the profiled lines, as well as all of the read/write memory traffic that is serviced from the main memory (e.g., DRAM).

For each line that is to be profiled, implementations of the present disclosure estimate the latency and energy consumption. In some examples, the latency and energy consumption are determined relative to the total execution time of the application, and the total energy consumed by the application, respectively. Implementations of the present disclosure provide a latency model and an energy model that can be executed to analyze the source code at the granularity of lines.

In some implementations, the latency T of a line l is provided as the time incurred by accesses to memory (e.g., DRAM) during execution of the line l, and can be determined based on the following example relationship:

$$T(l) = \mu_r(l)L_{DRAM,r} + \mu_w(l)L_{DRAM,w} + (1 - \mu_r(l))L_{LLC} + (1 - \mu_w(l))L_{LLC} \quad (1)$$

where $L_{DRAM,r}$ is the latency to read a cache block in memory, $L_{DRAM,w}$ is the latency to write a cache block in memory, $L_{LLC}$ is the latency to access the last level cache (LLC), $\mu_r(l)$ is the number of read memory accesses made during execution of the line l, and $\mu_w(l)$ is the number of write memory accesses made during execution of the line l.

In some implementations, the energy E of a line l is provided as the energy consumed by accesses to memory (e.g., DRAM) during execution of the line l, and can be determined based on the following example relationship:

$$E(l) = \mu_r(l)E_{DRAM,r} - \mu_w(l)E_{DRAM,w} + \tau S(l)P_{DRAM}T(l) \quad (2)$$

where $E_{DRAM,r}$ and $E_{DRAM,w}$ are the energy for reading and writing, respectively, to or from DRAM, $P_{DRAM}$ is the average leakage power per byte for DRAM, and the parameters S(l) and T(l) represent the size and lifetime, respectively, of object(s) accessed during execution of the line l.

Implementations of the present disclosure further provide an energy-delay (ED) for each line l. In some examples, ED combines the latency and the energy into a single metric, and can be determined based on the following example relationship:

$$ED(l) = \quad (3)$$
$$(\mu_r(l)E_{DRAM,r} + \mu_w(l)E_{DRAM,w} + \mu_w(l)L_{DRAM,w} + (1 - \mu_r(l))E_{LLC} +$$
$$(1 - \mu_w(l))E_{LLC}) \times (\mu_r(l)L_{DRAM,r} + \mu_w(l)L_{DRAM,w} +$$
$$\mu_w(l)L_{DRAM,w} + (1 - \mu_r(l))L_{LLC} + (1 - \mu_w(l))L_{LLC})$$

where $E_{LLC}$ is the energy consumed to access the LLC. In some examples, the ED for a particular line of code represents how much energy is consumed when the application executes that particular line of code and how much CPU cycles were consumed. Both of these metrics identify the correlation between the energy consumed as compared to the CPU cycles required to execute the particular line of code. For example, in reducing energy consumption, the ED indicates whether the reduction in energy comes at the cost of performance degradation.

In some implementations, the original source code, for which profile data is provided, can be modified to improve performance in terms of latency and/or energy consumptions. For example, a line of the source code can be changed to achieve the required functionality, but at a lower cost in terms of latency and/or energy. As one example, if a line of code is making random accesses over an array data structure, the line of code can be improved by modifying the line of code to make sequential access traversal. In this manner, most of accesses to the array data structure should be served from the processor caches $L_1$, $L_2$ or $L_3$. If most of the memory accesses are served from the caches, the locality of accesses for that particular line of code, as modified, has been improved. As a result, there will be fewer accesses to main memory like DRAM, which not only improves the performance (e.g., less CPU cycles consumed), but also saves energy (by less accesses to DRAM or NVM).

Figure 3:
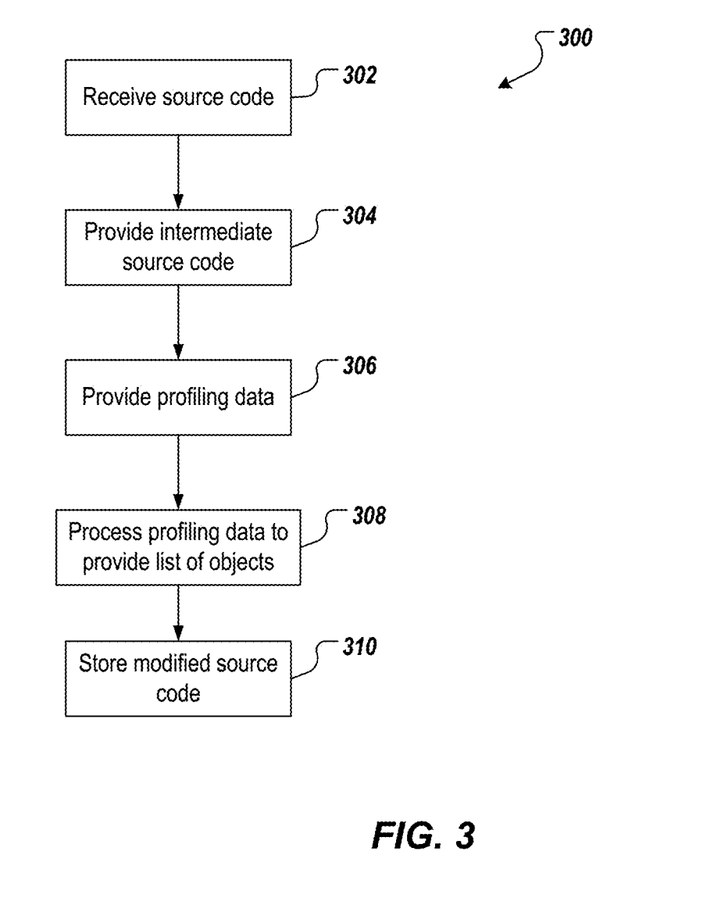
FIG. 3 depicts an example process that can be executed in accordance with implementations of the present disclosure.

FIG. 3 depicts an example process 300 that can be executed in accordance with implementations of the present disclosure. In some implementations, the example process 300 may be performed using one or more computer-executable programs executed using one or more computing devices.

Source code of an application is received (302). For example, the profiling tool can receive the source code of the application. Intermediate code is provided based on the source code (304). For example, a pass (e.g., LLVM pass) of the profiling tool can provide the intermediate code based on the source code, as described herein. In some examples, the intermediate code includes at least one instruction for profiling at least one line of the source code. Profiling data is provided (306). For example, the profiling tool processes the intermediate code based on simulated memory accesses, as described herein. The profiling data is processed to provide one or more metrics (308). For example, the profiling data is processed based on latency and/or energy models to provide respective latency and/or energy metrics for respective lines of the source code, as described herein. Modified source code is stored (310). For example, the modified source code is provided based on a modification of the at least one line of source code.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by one or more processors, the method comprising:
    receiving, by one or more processors, source code of an application;
    processing, by an LLVM pass of a compiler, the source code to provide intermediate code, the intermediate code comprising at least one instruction for profiling at least one line of the source code;
    executing, by a compile-time instrumentation framework, the intermediate code to generate profiling data;
    processing, by the one or more processors, the profiling data based on one or more of a latency model and an energy model to respectively provide at least one latency metric and at least one energy metric of the at least one line, the at least one latency metric of the at least one line indicating a time incurred by access to a memory during execution of the at least one line relative to a total execution time of the source code and the at least one energy metric of the at least one line indicating an energy consumption of the at least one line relative to a total energy time of the source code; and
    storing, by the one or more processors, a modified source code that is provided based on a modification of the at least one line of source code to improve execution performance of the source code and to save energy by minimizing a memory access, the modification of the at least one line of source code being associated to a second latency metric and a second energy metric of the at least one line, the second latency metric indicating a shorter time to access the memory than the at least one latency metric and the second energy metric indicating a smaller energy consumption than the at least one energy metric.

2. The method of claim 1, wherein the at least one instruction is provided based on at least one annotation included in the source code, the at least one annotation annotating the at least one line and indicating that the at least one line is to be profiled.

3. The method of claim 1, wherein the at least one annotation comprises an annotation immediately preceding the at least one line, and an annotation immediately following the at least one line.

4. The method of claim 1, wherein the latency metric indicates a latency in accessing memory based on execution of the at least one line.

5. The method of claim 1, wherein the energy metric indicates an energy consumed in accessing memory based on execution of the at least one line.

6. The method of claim 1, wherein the profiling data is provided based on a cache simulator.

7. The method of claim 1, wherein the modification of the at least one line of source code improves at least one of the at least one latency metric and at least one energy metric.

8. A non-transitory computer-readable storage medium coupled to one or more processors and having instructions stored thereon which, when executed by the one or more processors, cause the one or more processors to perform operations comprising:
    receiving source code of an application;
    processing, by an LLVM pass of a compiler, the source code to provide intermediate code, the intermediate code comprising at least one instruction for profiling at least one line of the source code;
    executing, by a compile-time instrumentation framework, the intermediate code to generate profiling data;
    processing the profiling data based on one or more of a latency model and an energy model to respectively provide at least one latency metric and at least one energy metric of the at least one line, the at least one latency metric of the at least one line indicating a time incurred by access to a memory during execution of the at least one line relative to a total execution time of the source code and the at least one energy metric of the at least one line indicating an energy consumption of the at least one line relative to a total energy time of the source code; and
    storing a modified source code that is provided based on a modification of the at least one line of source code to improve execution performance of the source code and to save energy by minimizing a memory access, the modification of the at least one line of source code being associated to a second latency metric and a second energy metric of the at least one line, the second latency metric indicating a shorter time to access the memory than the at least one latency metric and the second energy metric indicating a smaller energy consumption than the at least one energy metric.

9. The computer-readable storage medium of claim 8, wherein the at least one instruction is provided based on at least one annotation included in the source code, the at least one annotation annotating the at least one line and indicating that the at least one line is to be profiled.

10. The computer-readable storage medium of claim 8, wherein the at least one annotation comprises an annotation immediately preceding the at least one line, and an annotation immediately following the at least one line.

11. The computer-readable storage medium of claim 8, wherein the latency metric indicates a latency in accessing memory based on execution of the at least one line.

12. The computer-readable storage medium of claim 8, wherein the energy metric indicates an energy consumed in accessing memory based on execution of the at least one line.

13. The computer-readable storage medium of claim 8, wherein the profiling data is provided based on a cache simulator.

14. The computer-readable storage medium of claim 8, wherein the modification of the at least one line of source code improves at least one of the at least one latency metric and at least one energy metric.

15. A system, comprising:
a computing device; and
a computer-readable storage device coupled to the computing device and having instructions stored thereon which, when executed by the computing device, cause the computing device to perform operations comprising:
receiving source code of an application;
processing, by an LLVM pass of a compiler, the source code to provide intermediate code, the intermediate code comprising at least one instruction for profiling at least one line of the source code;
executing, by a compile-time instrumentation framework, the intermediate code to generate profiling data;
processing the profiling data based on one or more of a latency model and an energy model to respectively provide at least one latency metric and at least one energy metric of the at least one line, the at least one latency metric of the at least one line indicating a time incurred by access to a memory during execution of the at least one line relative to a total execution time of the source code and the at least one energy metric of the at least one line indicating an energy consumption of the at least one line relative to a total energy time of the source code; and
storing a modified source code that is provided based on a modification of the at least one line of source code to improve execution performance of the source code and to save energy by minimizing a memory access, the modification of the at least one line of source code being associated to a second latency metric and a second energy metric of the at least one line, the second latency metric indicating a shorter time to access the memory than the at least one latency metric and the second energy metric indicating a smaller energy consumption than the at least one energy metric.

16. The system of claim 15, wherein the at least one instruction is provided based on at least one annotation included in the source code, the at least one annotation annotating the at least one line and indicating that the at least one line is to be profiled.

17. The system of claim 15, wherein the at least one annotation comprises an annotation immediately preceding the at least one line, and an annotation immediately following the at least one line.

18. The system of claim 15, wherein the latency metric indicates a latency in accessing memory based on execution of the at least one line.

19. The system of claim 15, wherein the energy metric indicates an energy consumed in accessing memory based on execution of the at least one line.

20. The system of claim 15, wherein the profiling data is provided based on a cache simulator.

* * * * *